3,148,074
HIGH DIELECTRIC CONSTANT FLUIDS AND PLASTICIZERS

Michael Joseph D'Errico, Stamford, Conn., assignor to American Cyanamid Company, Stamford, Conn., a corporation of Maine
No Drawing. Filed Apr. 13, 1962, Ser. No. 187,209
8 Claims. (Cl. 106—197)

The present invention is concerned with a novel highly cyanoethylated cellulose composition (hereinafter referred to as "HCC"). More particularly, it deals with the provision of HCC compositions containing an effective amount of a plasticizer of the following Formula I:

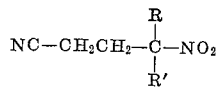

wherein R and R' are each either hydrogen, methyl, ethyl or cyanoethyl; and to the use of the latter as a dielectric material.

It is well known that cyanoethylated cellulose (both natural and regenerated) having a degree of substitution above 2.0, and a nitrogen content about 10.5%, i.e., HCC, has very desirable electrical characteristics for a number of purposes. Among these characteristics are a high dielectric constant and a relatively low dissipation factor. This fact has led to the consideration of HCC films in the fabrication of electroluminescent devices. In essence, such devices are comprised of two electrodes, at least one of which transmits light, between which a phosphor is embedded in a suitable matrix. A requirement for the matrix is that it have a high dielectric constant. Among the dielectric matrices for electroluminescent phosphors that have been suggested are the ethers of cellulose, for example in U.S. Patent 2,774,004; 2,792,447; 2,918,594 and 2,901,652. The latter in particular suggests cyanoethylated cellulose as a preferred material of high dielectric constant.

To be acceptable for such purposes, the material should have a high dielectric constant and a dissipation factor as low as possible since this is a measure of electrical energy which is converted into unwanted heat. In addition, such materials should be substantially colorless to be capable of transmitting the visible light emitted by the phosphor.

Unfortunately, the use in electroluminescent devices of a grade of HCC which exhibits the combination of desired electrical properties and lack of color has been hampered by several obstacles. Probably the most serious is the poor degree of adhesion of the HCC to the conductive coating on the electrode (such an electrode typically being glass or some equivalent transparent or translucent non-conductor having a conductive coating consisting of a tin oxide film as shown in U.S. Patent 2,838,715, for example). In order to get good electrical contact, the adhesion of the phosphor-containing matrix to the conductive coating on the glass must be sufficient to insure that the matrix film will not spontaneously peel from the conductive surface during the drying period which follows the formation of the film. While the desired quality grade of HCC exhibits adequate adhesion to the glass or its equivalent, it frequently gives unsatisfactory results when films are cast on the layer of tin oxide or its equivalent which comprises the electrode surface of the conductive glass. Furthermore, the film obtained using a suitable grade of HCC is often pitted and uneven due to poor dispersibility of phosphor therein, and has less strength and toughness than are desirable. While the shortcomings of the film are not as serious drawbacks as poor adhesion, any improvement in these respects, especially if not at the expense of the electrical properties, will also be desirable. Previous attempts to find suitable HCC materials have encountered some difficulties along these lines.

It is, therefore, the principal object of the present invention to provide an HCC composition suitable for use in such dielectric applications as the preparation of phosphor-bearing matrices, and the like, without being subject to the above-noted physical difficulties. This has been accomplished in a relatively simple, but surprisingly successful, manner.

In general, the desired result is accomplished by the provision of a mixture essentially containing from about 40 to about 90 percent HCC and from about 60 to about 10 percent by weight of a compound of Formula I. In preferred compositions, the mixture includes 45 to 55% of a compound of Formula I.

It is quite surprising that the inclusion of the aforementioned compounds in HCC is helpful in obtaining the desired result since other compounds having a chemical similarity thereto are unsatisfactory in that they decrease the strength of the HCC, interfere with its ability to disperse the phosphor, either do not improve, or actually decrease, its adhesion to glass, or else detract from its electrical properties.

HCC suitable for use in the compositions of this invention may be derived from either natural cellulosic fibers or one of the available forms of regenerated cellulose. Several forms of both are commercially available, as for example cotton linters, viscose rayon, rayon floc and the like. Within reasonable limits any available product may be used. The cyanoethylated nitroalkanes of Formula I are believed to be old compounds and they are thus available from several sources. They may, however, be synthesized, if this is desired, using the method of Buckley et al., J.C.S., 1947, p. 1505. This involves, generally, the refluxing of a caustic alcoholic solution of the nitroalkane and acrylonitrile.

Preparing the compositions of this invention is a simple matter of measuring out the desired quantities of each of the two essential components and admixing them until an homogeneous composition is obtained. The blending may be facilitated, if desired, by separately dissolving one or both of the components in a solvent such as acetonitrile, prior to bringing the two components into contact with each other.

Films of the compositions of this invention can be prepared by methods conventional in the art. They can be cast from solutions (in solvents such as acetonitrile, dimethyl formamide, acetone, and mixtures thereof) with or without phosphor material, by pouring onto glass (or onto an electrode material such as lead foil, if desired) and then dried in a warm air stream. Alternatively, they can be prepared by roll milling. The choice of method can be made to give films which satisfy the intended end use thereof.

The invention will be more fully discussed in conjunction with the following illustrative examples in which, unless otherwise noted, all parts and percentages are by weight and all temperatures are expressed in degrees centigrade.

EXAMPLE 1

*4-Nitro-4-Methylvaleronitrile*

A solution of 1424 parts of 2-nitropropane and 70 parts of aqueous 33% KOH, dissolved in 4000 parts by volume of ethanol, is heated to reflux (about 80°). 848 parts of acrylonitrile are added at such a rate that gentle refluxing is maintained during which time the pale yellow solution changes gradually blue and finally green. The reaction mixture is refluxed for an additional hour and allowed to cool to room temperature. The pH is adjusted to 4 by the addition of 20% $H_2SO_4$ and excess acid is neutralized with $BaCO_3$. Solids are removed by filtration and the ethanol is stripped. The crude product is vacuum distilled to yield the product, a pale yellow liquid, boiling at 108°–110° C./1.9–2.1 mm. Hg.

EXAMPLE 2

*4-Nitrobutyronitrile*

Following the procedure of Example 1 except for the substitution of an equimolar quantity of nitromethane for the nitropropane used therein, there is obtained the product 4-nitrobutyronitrile.

EXAMPLE 3

*Bis-(β-Cyanoethyl)Nitromethane*

This product is obtained by following the procedure of Example 1 identically except for the reduction by one half of the amount of 2-nitropropane.

By the reaction of nitroethane or 1-nitropropane with acrylonitrile using the foregoing procedure, cyanoethylated nitroethanes and 1-nitropropanes are obtained.

EXAMPLE 4

A. *Preparation of HCC*

To a suspension of 120 g. of regenerated cellulose in 3 liters of acrylonitrile held at 50° C., is added dropwise over a five-minute period an aqueous solution of 6.0 g. of sodium hydroxide. The total water content of the reaction mixture amounts to 120 g. Agitation is continued at 50° C. for 4 hours at which time the mixture is neutralized with acetic acid. The cyanoethylated cellulose has completely dissolved in the excess acrylonitrile during this period. The resultant solution is filtered under pressure and then added dropwise to a stirred vessel containing boiling water. Acrylonitrile is thereby steam-distilled causing the cyanoethylated cellulose to precipitate as a white, fibrous solid. The product is washed repeatedly with water and then dried. Analysis shows a nitrogen content of 12.6%.

B. *Preparation of Films*

Solutions containing 10% dissolved solids are prepared from the products of previous examples using acetonitrile as solvent and equal parts of HCC and each of the compounds of the preceding examples. These solutions are cast on lead foil, and allowed to dry first at 40° C. for four hours, and then for 1 hour at 70° C. to give films having a thickness of approximately 2 mils. The electrical properties were measured after vacuum desiccation over $P_2O_5$ according to ASTM test D-150-54T at 60 cycles/sec., 25° C. under an atmosphere of dry nitrogen.

The film comprised of 50% of HCC and 50% of the product of Example 1, in addition to adhering well to the foil and retaining its flexibility, exhibits desirable electrical properties, having a dissipation factor of 0.014 and a dielectric constant of 14.

EXAMPLE 5

Following the procedure of Example 4, films were prepared from HCC and the products of Examples 1–3, using different proportions of these components.

Films composed of HCC and only 10% of a compound of Examples 1–3, showed good electrical properties, but did not have either the adhesiveness or the flexibility of products of the preceding example.

Films composed of HCC and 60% of a compound of Examples 1–3 possessed the desired adhesiveness, flexibility and electrical properties.

I claim:

1. A composition of matter consisting essentially of highly cyanoethylated cellulose having a degree of substitution above about 2.0 and at least 10.5% by weight nitrogen, and from about 10% to 60% by weight, based on the total weight of the composition, of a compound of the formula

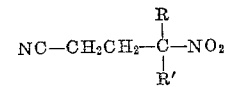

wherein R and R' are members individually selected from the group consisting of hydrogen, methyl, ethyl and cyanoethyl.

2. The composition of claim 1 wherein the weight of said compound is between 45% and 55% of the composition.

3. The composition of claim 1 wherein the weight of said compound is about 50% of the composition.

4. The composition of claim 1 wherein the compound is 4-nitro-4-methylvaleronitrile.

5. The composition of claim 3 wherein the compound is 4-nitro-4-methylvaleronitrile.

6. In the process of forming films of highly cyanoethylated cellulose having a degree of substitution above about 2.0 and at least 10.5% by weight nitrogen, by forming a mixture of said cellulose and a plasticizer in a solvent, and then drying and shaping said mixture to give the desired film, the improvement which comprises employing as the plasticizer between about 10% and 60% on the weight of the composition, of a compound of the formula

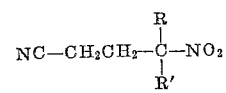

wherein R and R' are members selected individually from the group consisting of hydrogen, methyl, ethyl and cyanoethyl.

7. The method of claim 6 wherein the plasticizer is employed in an amount equal to about 45% to 55% of the composition.

8. The method of claim 6 wherein the plasticizer is 4-nitro-4-methylvaleronitrile.

References Cited in the file of this patent

UNITED STATES PATENTS

| | | |
|---|---|---|
| 2,361,259 | Bruson | Oct. 24, 1944 |
| 2,819,979 | Baumer et al. | Jan. 14, 1958 |
| 3,067,141 | Bikales et al. | Dec. 4, 1962 |